I. CHASE.
HYDROPLANE BOAT.
APPLICATION FILED JUNE 14, 1911.
1,050,517.
Patented Jan. 14, 1913.
4 SHEETS—SHEET 1.
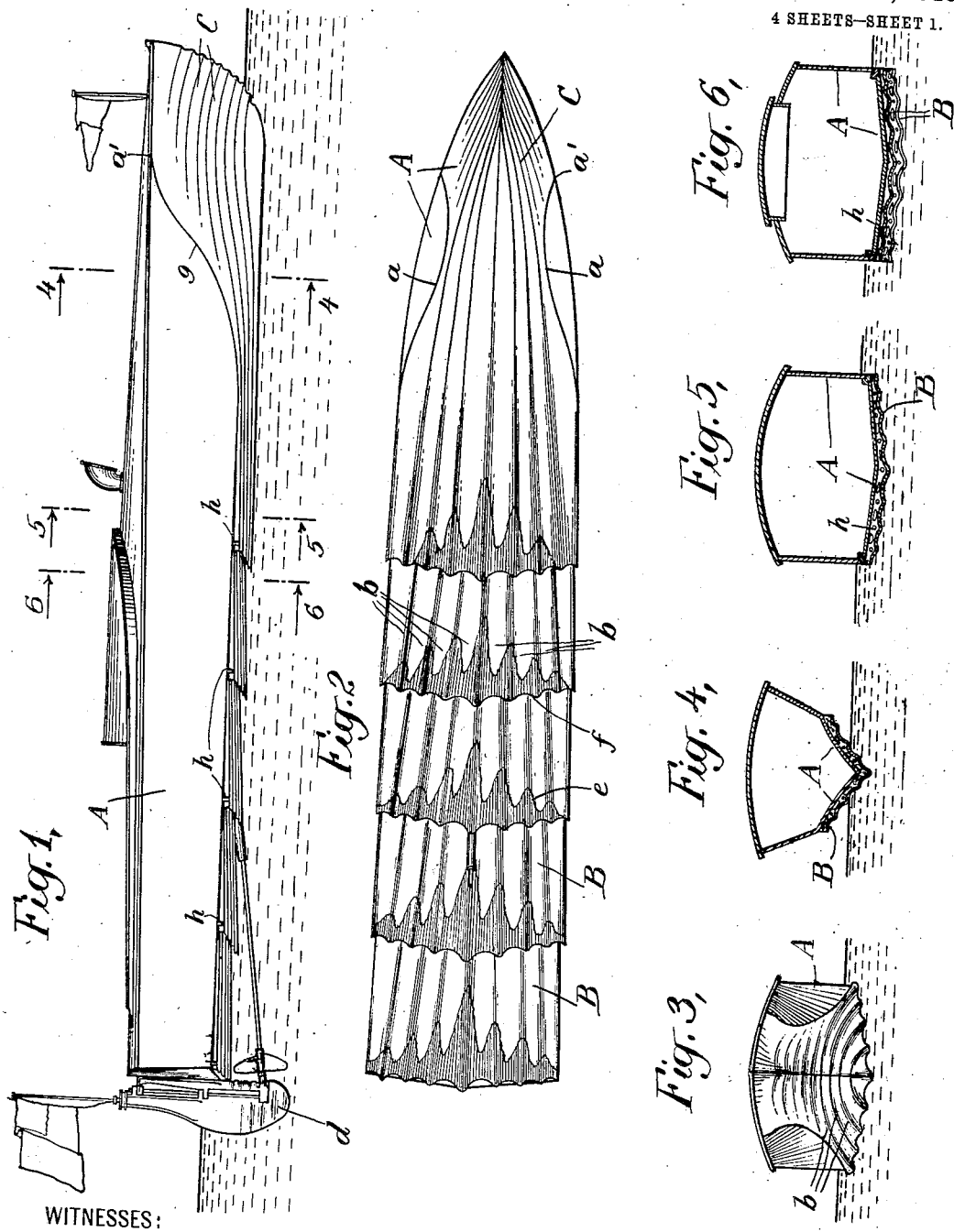
WITNESSES:
INVENTOR
BY
ATTORNEYS I. CHASE.
HYDROPLANE BOAT.
APPLICATION FILED JUNE 14, 1911.
1,050,517.
Patented Jan. 14, 1913.
4 SHEETS—SHEET 2.
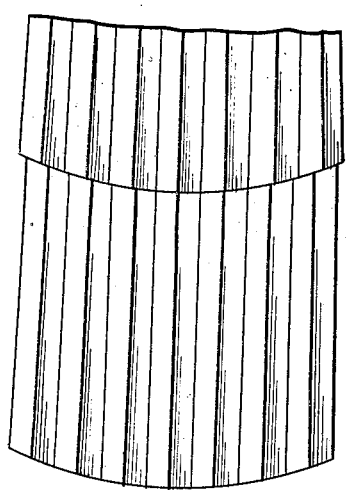
Fig. 8.
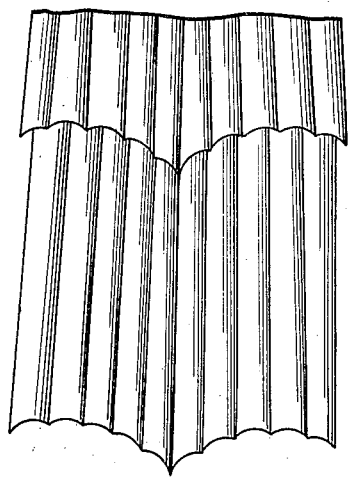
Fig. 10.
Fig. 7.
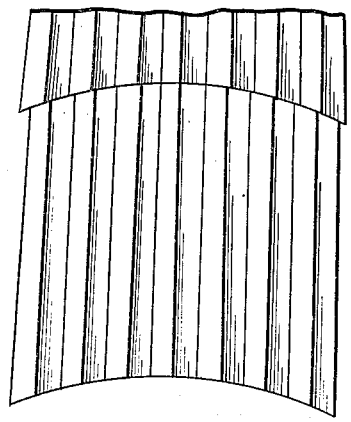
Fig. 9.
WITNESSES:
INVENTOR
BY
ATTORNEYS I. CHASE.
HYDROPLANE BOAT.
APPLICATION FILED JUNE 14, 1911.
1,050,517.
Patented Jan. 14, 1913.
4 SHEETS—SHEET 3.
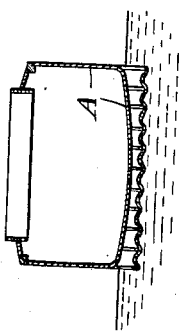
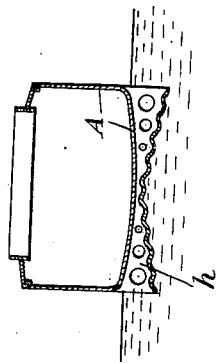
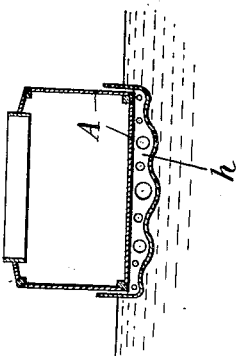
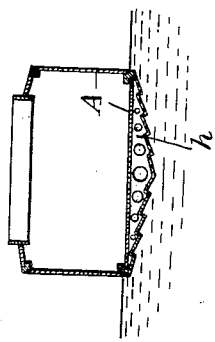
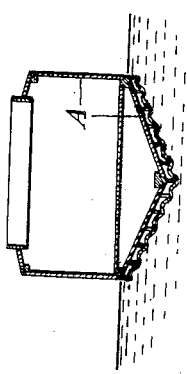
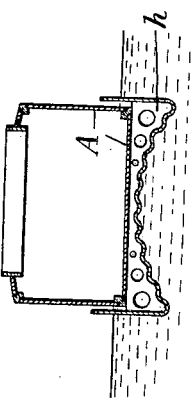
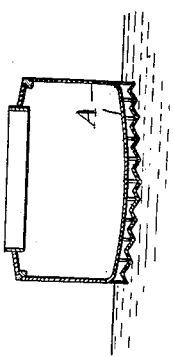
WITNESSES:
INVENTOR
BY
ATTORNEYS I. CHASE.
HYDROPLANE BOAT.
APPLICATION FILED JUNE 14, 1911.
1,050,517.
Patented Jan. 14, 1913.
4 SHEETS—SHEET 4.
WITNESSES:
INVENTOR
BY
ATTORNEYS

UNITED STATES PATENT OFFICE.

IRWIN CHASE, OF BAYONNE, NEW JERSEY, ASSIGNOR TO ELECTRIC LAUNCH COMPANY, OF BAYONNE, NEW JERSEY, A CORPORATION OF NEW JERSEY.

HYDROPLANE-BOAT.

1,050,517.  Specification of Letters Patent.  Patented Jan. 14, 1913.

Application filed June 14, 1911. Serial No. 633,102.

*To all whom it may concern:*

Be it known that I, IRWIN CHASE, residing at Bayonne, county of Hudson, State of New Jersey, have invented certain new and useful Improvements in Hydroplane-Boats; and I do hereby declare the following to be a full, clear, and exact description of the invention, such as will enable others skilled in the art to which it appertains to make and use the same.

The invention contemplates the coadaptation of a buoyant hull and hydroplane members of novel configuration, secured thereto and designed to assume increments of the weight of the hull as the speed is increased and eventually to support the entire hull above the surface of the water, wholly relieving it of its buoyant function when high speed is attained. The state of repose, the interval of acceleration from repose to high speed, and the period of continuance of high speed, constitute three phases which will be considered in connection with the hydroplane boats forming the subject matter of this application. The state of repose requires merely a suitable and sufficient displacement of the water by the buoyant hull to support the hull and its appointments in a stable manner. The interval of acceleration to high speed demands that every means of lessening the resistance to the forward motion of the boat be employed. The hull should be designed to minimize the resistance to forward movement at all times during its varying displacement and disturbance of the water and to withstand the strains incident to the substitution of the support of the hydroplane members for its buoyant support on the water, while the hydroplane members should be designed to take up the necessary support of the hull, afford the least possible resistance to the water and maintain stability and control of direction. During the period of continuance of high speed the hull is entirely above the surface of the water, being supported solely upon the hydroplane members, and an unbroken hull structure from stem to stern is desirable to withstand the severe strain to which it is subjected when rough water is encountered. The characteristics then most desired in the hydroplane members are the capacity to maintain the stability and direction of the craft, a form which will effect the least possible disturbance of the water over which they travel and offer the least possible resistance to forward movement.

With the object in view of producing a boat capable of high speed I have realized the several features of configuration and structure which are hereinafter described in detail and embodied and combined in the boat illustrated in the accompanying drawings.

In the drawings—Figure 1 represents a side elevation of a preferred embodiment of my invention in a high speed hydroplane boat. Fig. 2 is an inverted plan showing the bottom surfaces of the hydroplanes. Fig. 3 is a bow elevation. Fig. 4 is a section on line 4—4 of Fig. 1. Fig. 5 is a section on line 5—5 of Fig. 1. Fig. 6 is a section on line 6—6 of Fig. 1. Figs. 7 to 10 represent inverted plans of modified forms of hydroplanes. Figs. 11 to 17 represent midship cross-sections of variously modified embodiments of this invention; and Figs. 18 to 27 represent cross-sections of various forms of corrugate hydroplanes showing profiles of their corrugate surfaces.

Referring to the drawings like reference characters indicating like parts throughout the several views, I prefer that the buoyant hull indicated by the letter A should substantially conform to the box type shown and should have an unbroken bottom line from stem to stern to admit of the strongest fore and aft construction in which the keel and strakes may be continuous. The chines $a$ at the junction of the comparatively flat bottom and the sides of the buoyant hull A are carried up to meet the deck line at the point $a'$ some little distance aft of the cutwater so as to make the whole bow and entrance one continuous surface with the bottom strakes, and in such manner that the breasts formed just forward and inboard from the chine shall at a point slightly above the water surface when the boat is planing make a large and effective angle, (preferably of about 45°) with the horizontal. The water-lines at this point are slightly hollow and run forward to the cutwater with gradually decreasing curvature.

The surfaces just forward of the chine are thus admirably adapted to lift the bow without shock when the boat encounters a transverse wave. So also when a hydroplane boat is running in a quartering sea, there is a serious tendency to pitch heavily to leeward just as it clears the crest of a wave; the boat dropping by the head and listing so as to partially submerge one side. With chine and bow built as described there is a powerful righting force exerted under these conditions. The gradual angle at which the surface encounters the water produces great pressure without shock, and the effective surface being at approximately the maximum beam of the boat, the longest righting arm available is used.

The bottom proper of the buoyant hull should have an unbroken smooth under surface from stem to stern but this surface should conform to the general plan of the required arrangement of the series of hydroplane members B which are to be attached to it.

Heretofore in hydroplane boats unstable conditions have arisen when the boat arose on the hydroplanes, as a tendency to skid developed due to the absence of sufficient lateral resistance offered by the smooth or plane surfaces of the hydroplanes and the direction of travel could not be maintained. When skidding occurred water was piled up on one side or the other and in many cases the boat immediately capsized. Efforts to counteract this tendency to skid have been made with varying success by fitting the hull with external keels, fins or abnormally large rudders but always at the sacrifice of speed by the addition of resistance to the water.

I have increased the stability and direction maintaining character of boats of this class and the lifting power of the planes by providing the hydroplane members B with corrugate under surfaces, the corrugations $b$ running in a general way lengthwise of the boat but as it is advisable under certain circumstances to so place the corrugations that they will practically follow the normal stream lines and in some cases so that they will influence the passage of the surface water under the boat they need not be exactly parallel to the center line of the boat. It is desirable to carry out this use of corrugate surfaces wherever contact is had with the water at any time during the running of the boat and I may carry corrugations $c$ to the extreme bow, to meet and give the cut-water a serrate or wavy profile.

The rudder and its supports may also be provided with corrugate surfaces $d$ running in a substantially horizontal direction influencing in a measure the direction of the stream lines along these surfaces.

When the boat is running at high speed the line $e$ where the hydroplanes first touch the water is sinuous, wavy or serrate when corrugations are used (see shaded parts representing wetted surface in Fig. 2) and this formation enters the water with greater ease and with less disturbance of the surface of the water at this point and consequently with less resistance than the unbroken line of initial contact of a flat or fair surface.

The corrugate under surfaces of the hydroplanes offer great lateral resistance holding the craft to its true course and causing the surface water to pass straight under the boat with little lateral deflection which is the ideal condition sought, since it has the effect of increasing both the lifting power of the planes and the direction maintaining characteristics of the boat. Such variations from the straight fore and aft as may be given the corrugations will always tend toward a more perfect result and will be directed to confining in the most advantageous manner the stream lines of the water necessarily displaced.

I prefer to give the rear edges $f$ of the corrugate hydroplanes a serrate or wavy profile (see Figs. 2, 7 and 10) as these forms leave the water with little resistance and smooth the wake.

In order that air be freely admitted to the pockets formed between the several hydroplanes when running I do not flatten the forward edges of corrugated sheet hydroplanes where they meet the under surfaces of the buoyant hull but leave the interstices $g$ (see Fig. 18) formed by the cross-section of the corrugations open. These interstices serve to permit air from under one hydroplane to pass under the next and to some extent, when the boat is reversed, to allow the water pocketed under the hydroplanes to escape.

In Figs. 14 and 15 I have shown the hydroplanes carried up at the sides to a point above the load water line providing a space between the sides of the hydroplanes and the sides of the buoyant hull through which space air can reach the pockets under the planes and stream under the boat when running.

When corrugate sheet hydroplanes are employed the corrugations give great longitudinal strength and transverse bridges $h$ apertured to permit of the passage of air and water may be advantageously used, and present a strong light construction.

The mean outline of the rear edges of the hydroplanes, not taking into consideration the wavy or serrate detailed form before mentioned may be given any desired form, a number of forms being shown in Figs. 7 to 10 and the preferred form showing in Fig. 2.

In Figs. 11 to 17, I have shown profiles of a number of applications of my corrugated hydroplanes to continuous bottom hulls, the preferred forms of which, however are those illustrated in Figs. 11 and 17, in which the profile of the bottom of the boat is made to correspond or in other words to be substantially parallel with the profile of the hydroplanes. This preferred arrangement is of course embodied in the preferred form of boat illustrated in Figs. 1 to 6. The profiles of corrugated members shown in Figs. 18 to 27 illustrate some of the many forms of corrugated surfaces which can be advantageously used and in those figures they are shown as corrugated sheet material. These same corrugated surfaces may be produced upon one side of thicker material if sheet material is not desired.

Figs. 18 to 27 illustrate the corrugated members with their mean surfaces plane but of course they may be inclined upwardly or downwardly from the keel as planes or curved surfaces as the particular design to which they are applied may call for.

While it is preferred to apply the corrugate water contacting surfaces to hydroplanes which are not surfaces of the buoyant hull itself, nevertheless I do not wish to confine their use to such hydroplanes but desire to protect their use directly upon the surface of the buoyant hull as well.

Having thus described my invention what I claim is:

1. A boat provided with a surface skimming hydroplane having a keelwise corrugated under surface devoid of transverse obstructions.

2. A boat provided with a stepped series of surface skimming hydroplanes having keelwise corrugated under surfaces devoid of transverse obstructions.

3. A boat comprising a buoyant hull having an unbroken bottom surface and a surface skimming hydroplane, secured to said bottom surface said hydroplane having a keelwise corrugated under surface devoid of transverse obstructions.

4. A speed boat, the forebody of which has water lines making a fine entrance and extending with increasing outward curvature into a chine which intersects the deck line at a region of wide beam well aft of the cut water, the breasts formed just inboard and forward of the chine above the running load water line making large and effective angles with the horizontal.

5. A hydroplane boat having a forward supporting hydroplane, the fore body of the hull of said boat having water lines making a fine entrance and extending with increasing outward curvature into a chine which intersects the deck line at a region of wide beam well aft of the cut water and forward of the said supporting hydroplane, the breasts formed above the running load water line just inboard and forward of the chine making large and effective angles with the horizontal.

6. A hydroplane boat having a hydroplane provided with fore and aft corrugations on the bottom of the hull, the fore body of said hull having water lines making a fine entrance and extending with increasing outward curvature into a chine which intersects the deck line at a region of wide beam well aft of the cut water, the breasts formed above the running load water line just inboard and forward of the chine making large and effective angles with the water lines.

7. A hydroplane boat comprising a buoyant hull of box type having an unbroken bottom surface with chines intersecting the deck line aft of the cutwater and a stepped series of hydroplanes secured to said bottom surface and provided with corrugations in their water contacting surfaces taking a general fore and aft direction.

8. A hydroplane boat comprising a buoyant hull having a continuous bottom and a stepped series of surface skimming hydroplane members secured to said bottom, said hydroplanes having substantially fore and aft directed corrugations in their water contacting surfaces, and said bottom being substantially conformed in cross section to the desired cross-section of said members.

9. The combination with a buoyant hull of surface skimming corrugated sheet hydroplane members secured thereto, the under surfaces of said hydroplane members being devoid of transverse obstructions.

10. The combination with a buoyant hull of corrugated sheet metal hydroplane members secured to said hull with their corrugations running generally fore and aft, the under surfaces of said hydroplane members being devoid of transverse obstructions.

11. The combination with a buoyant hull having a continuous bottom of corrugated sheet metal hydroplane members having their forward ends secured directly to said bottom and their rearward ends spaced from said bottom by transverse bridges, the under surfaces of said hydroplane members being devoid of transverse obstructions.

12. The combination with a buoyant hull of corrugated hydroplane members attached at their forward ends to said hull and spaced therefrom at their rearward ends by bridges, the space between the hydroplane members and the hull being open forward and aft to permit flow of water longitudinally between the hull and the hydroplane.

13. In a hydroplane boat, the combination with a buoyant hull of a stepped series of corrugated sheet metal hydroplane members attached at their forward edges to said hull and spaced from said hull at their rearward edges, the corrugations of said members taking a generally fore and aft direction and providing interstices at the point of attachment of the forward edge of said members to the hull through which air may pass to the space beneath said members.

In testimony whereof I affix my signature, in presence of two witnesses.

IRWIN CHASE.

Witnesses:
  WILLIAM H. DAVIS,
  MARCUS C. HOPKINS.